(12) United States Patent  (10) Patent No.: US 7,298,411 B2
Aoki  (45) Date of Patent: Nov. 20, 2007

(54) DIGITAL CAMERA

(75) Inventor: Shinya Aoki, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 729 days.

(21) Appl. No.: 10/446,057

(22) Filed: May 28, 2003

(65) Prior Publication Data

US 2004/0001158 A1 Jan. 1, 2004

(30) Foreign Application Priority Data

May 28, 2002 (JP) ............................. 2002-154399

(51) Int. Cl.
*G03B 13/00* (2006.01)
(52) U.S. Cl. ..................... 348/345; 348/346
(58) Field of Classification Search ........ 348/345–346, 348/349, 351, 354, 350, 352, 353, 341
See application file for complete search history.

(56) References Cited

U.S. PATENT DOCUMENTS 5,757,429 A * 5/1998 Haruki ....................... 348/354

6,271,883 B1 * 8/2001 Iijima et al. ................. 348/345
2001/0010556 A1 * 8/2001 Sugimoto et al. ........... 348/345
2002/0114015 A1 * 8/2002 Fujii et al. .................. 358/302

FOREIGN PATENT DOCUMENTS

JP 2000-330009 11/2000
JP 2001-208959 A 8/2001
JP 2003-315669 11/2003

* cited by examiner

*Primary Examiner*—David Ometz
*Assistant Examiner*—Tuan Le
(74) *Attorney, Agent, or Firm*—Birch, Stewart, Kolasch & Birch, LLP (57) ABSTRACT

An operational state of C-AF processing is judged. If the operational state is judged to not be a focused state, when the operational state is a state of fine adjustment, only a range in a vicinity of a current position of a focus lens is searched, and a focused state is set. When the operational state is a state where the focus lens is being driven to a focus position, only a range in a vicinity of a focus position already been detected is searched, and the focused state is set. When the operational state is a state during searching for a peak, searching is carried out in a current driving direction from a current position of the focus lens, and the focused state is set. When the operational state is none of above states, an entire region is searched, and the focused state is set.

9 Claims, 6 Drawing Sheets

DIGITAL CAMERA

CROSS-REFERENCE TO RELATED APPLICATION

This application claims priority under 35 USC 119 from Japanese Patent Application No. 2002-154399, the disclosure of which is incorporated by reference herein.

BACKGROUND OF THE INVENTION

1. Field of the Invention

The present invention relates to a digital camera, and in particular, to a digital camera equipped with an autofocus (AF) function which automatically carries out focal point adjustment.

2. Description of the Related Art

Digital cameras have become more popular in recent years. A digital camera photographs, as a still image or a dynamic image, a subject by using a solid-state image pickup system formed to include a solid-state image pickup element such as a CCD (charge coupled device) sensor or the like which picks up the subject. Such a digital camera is usually equipped with a lens system for imaging the subject onto the solid-state image pickup element. The lens system is structured to include a zoom lens which is formed by a plurality of lens groups, and a focus lens which focuses the subject which is the object of photographing.

When the power of the digital camera main body is off, the zoom lens and the focus lens of the lens system are brought together compactly and stored within a lens barrel which sinks into a case. Here, when the power of the digital camera main body is turned on, the lens barrel is extended to a predetermined reference position. Due to this extending of the lens barrel, the zoom lens and the focus lens are moved to predetermined positions within the space formed within the case, and are set in a standby state so as to await photographing (photographing standby state).

When a subject is photographed, by changing the focal length of the lens system by driving the zoom lens, the range of the photographing angle (the angle of field) can be set to a desired angle. Further, the focus position, at which the subject is in a focused state, is searched for (AF searching), and focus control for moving the focus lens to this focus position is carried out automatically (the AF function). This AF function is carried out at the point in time when the user depresses the release button halfway when photographing a subject. In this way, the subject corresponding to the AF frame provided within the finder is set in a focused state (AF locking), and a state in which it is possible to photograph a good image is set.

When taking a photograph by using a digital camera such as that described above, in order to not miss the chance for a good shot, it is preferable that the AF control processing time, which is the period of time from after the release button is depressed halfway until AF locking on the subject is carried out and a state in which photographing is possible arises, is made as short as possible.

In order to shorten the AF control processing time, a conventional technique has been proposed in which the search starting point, the searching direction, the search range, the method of judging focussing, and the like of the AF search are set in accordance with the photographing mode of the digital camera (refer to Japanese Patent Application Laid-Open (JP-A) No. 2001-208959 for example).

However, in the AF control in the aforementioned conventional technique, there are cases in which the chance for a good shot is missed due to the fixing of the focus position not being carried out in time for the desired shot. Thus, it cannot be said that the AF processing performance with respect to a subject at the time of photographing is satisfactory.

SUMMARY OF THE INVENTION

The present invention was developed in order to overcome the above-described problems, and an object of the present invention is to provide a digital camera in which the AF control processing time is shortened and the AF processing performance with respect to a subject at the time of photographing is improved.

A first aspect of the present invention is a digital camera comprising: an imaging section imaging, at a predetermined imaging position, light corresponding to a subject; an image pickup section receiving, at a predetermined light-receiving surface, light corresponding to the subject which is incident via the imaging section, and generating image information corresponding to the subject on the basis of an amount of received light of the light; a photographing controlling section carrying out control of execution of photographing processing which acquires the image information generated by the image pickup section; a moving section moving at least one of the imaging section and the image pickup section in a direction of an optical axis of light incident via the imaging section; a standby-time focus controlling section which, at a time of standby before execution of the photographing processing by the photographing controlling section, controls the moving section so as to continuously set a focused state in which the imaging position by the imaging section and a position of the light-receiving surface of the image pickup section coincide; a focus instructing section instructing setting of the focused state, at a time of execution of the photographing processing by the photographing controlling section; and a photographing-time focus controlling section which, at a point in time when an instruction is given by the focus instructing section, interrupts focus control by the standby-time focus controlling section, and on the basis of an operational state of the focus control at a point in time of interruption, controls the moving section such that a processing time required for setting of the focused state is shortest.

In accordance with the first aspect of the invention, the imaging section images, at a predetermined imaging position, light corresponding to a subject. The image pickup section receives, at a predetermined light-receiving surface, light corresponding to the subject which is incident via the imaging section, and generates image information corresponding to the subject on the basis of a received light amount of the light. The photographing controlling section carries out control of execution of photographing processing which acquires the image information generated by the image pickup section. At a time of standby before execution of the photographing processing by the photographing controlling section, the standby-time focus controlling section controls the moving section, which moves at least one of the imaging section and the image pickup section in a direction of an optical axis of light incident via the imaging section, so as to continuously set a focused state in which the imaging position by the imaging section and a position of the light-receiving surface of the image pickup section coincide. Here, for example, the standby-time focus controlling section controls the moving section such that the focused state is set continuously, while carrying out the processing of judging whether or not there is a focused state by repeatedly evaluating the degree of coincidence of the imaging position with respect to the light-receiving surface of the image pickup section. In this way, focus control can be carried out following the movement of the subject, even when, for example, the subject is a moving object. Further, at a time of execution of the photographing processing by the photographing controlling section, the focus instructing section instructs setting of the focused state. During standby when focus control by the standby-time focus controlling section is being executed, when there is an instruction from the focus instructing section to set the focused state, the photographing-time focus controlling section, at the point in time when the instruction is given by the focus instructing section, interrupts focus control by the standby-time focus controlling section, and on the basis of the operational state of the focus control at the point in time of this interruption, controls the moving section such that the processing time required for setting of the focused state is shortest. Here, the focus position, which is to be controlled by the moving section in order to set the focused state, can be estimated to a certain extent from the operational state of the focus control by the standby-time focus controlling section which was interrupted. In this way, on the basis of the operational state of the focus control by the standby-time focus controlling section which was interrupted, the moving section is controlled such that the processing time required for setting of the focused state is the shortest. The processing time, from the time an instruction for focused state setting is given by the focus instructing section to the time of setting of the focused state, can thereby be greatly reduced.

The feature of a second aspect of the present invention is that the invention of the first aspect further comprises: a storing section successively storing the operational state of the focus control by the standby-time focus controlling section, wherein, on the basis of the operational state of the focus control stored in the storing section, the photographing-time focus controlling section controls the moving section such that the processing time required for setting of the focused state is shortest.

In accordance with the second aspect of the invention, the storing section successively stores the operational state of the focus control by the standby-time focus controlling section. In the focus control by the photographing-time focus controlling section, the moving section is controlled on the basis of the operational state of the focus control stored in the storing section. Thus, the operational state of the focus control by the standby state focus controlling section, which was interrupted at the time of execution of the photographing processing, can be appropriately recognized, and can be reflected in the focus control.

The feature of a third aspect of the present invention is that, in the first or second aspect, the photographing-time focus controlling section controls the moving section by a control method appropriately selected, on the basis of the operational state of the focus control at the point of time of interruption, from plural types of control methods determined in advance such that the processing time, which is required for setting of the focused state in accordance with the operational state of the focus control by the standby-time focus controlling section, is shortest.

In accordance with the third aspect of the invention, the photographing-time focus controlling section controls the moving section by a control method appropriately selected, on the basis of the operational state of the focus control at the point of time of interruption, from plural types of control methods determined in advance such that the processing time, which is required for setting of the focused state in accordance with the operational state of the focus control by the standby-time focus controlling section which was interrupted, is shortest. Here, the following are examples of a control method which is appropriately selected, on the basis of the operational state of the focus control, such that setting can be carried out from this operational state to the focused state in the shortest time: a method of changing the moving direction at the time of controlling movement of at least one of the imaging section and the image pickup section; a method of changing the moving range at the time of controlling movement of at least one of the imaging section and the image pickup section; and the like. In this way, the processing time until the focused state is set can be greatly shortened without carrying out complex control processing.

DETAILED DESCRIPTION OF THE PREFERRED EMBODIMENT

Hereinafter, an embodiment of the present invention will be described in detail with reference to the drawings.

Figure 1A:
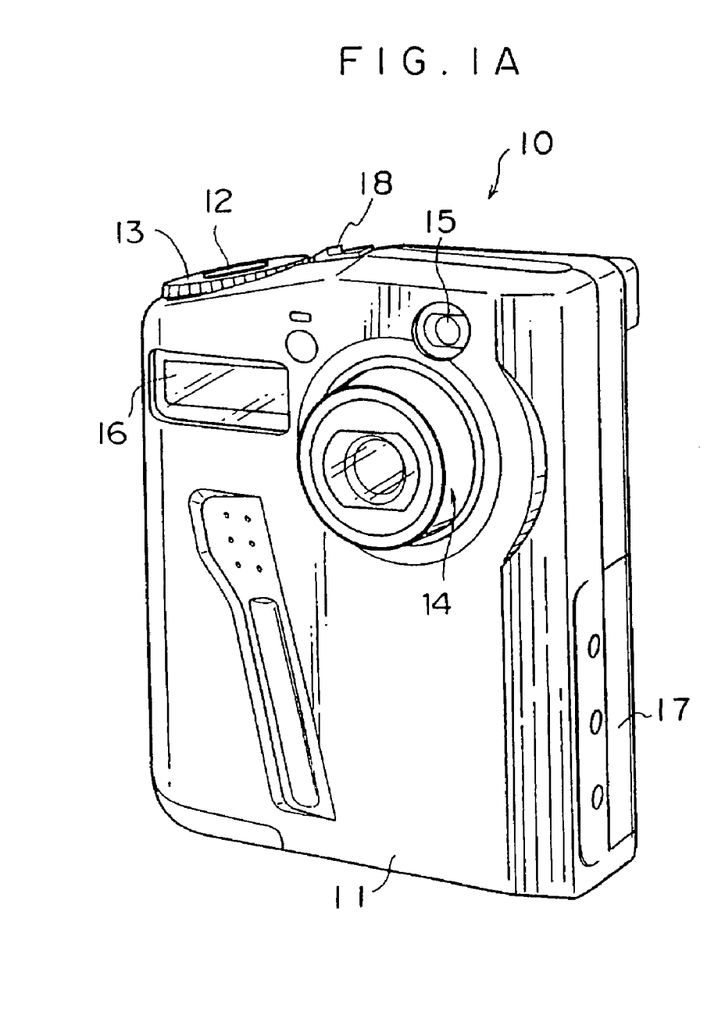
FIG. 1A is a perspective view showing the exterior of a front side of a digital camera relating to an embodiment of the present invention.
Figure 1B:
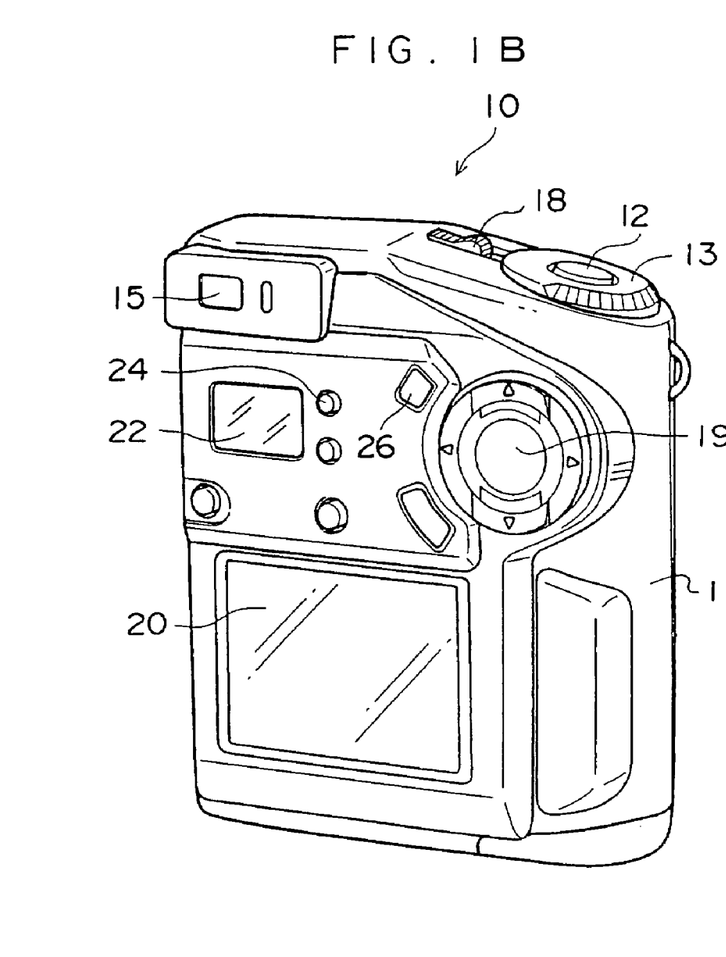
FIG. 1B is a perspective view showing the exterior of a rear side of the digital camera relating to the embodiment of the present invention.

The schematic structure of a digital camera 10 relating to the present embodiment is shown in FIGS. 1A and 1B. A main body 11 of the digital camera 10 is formed in a substantial box shape. A grasping portion for grasping the main body 11 is formed at the left side as seen from the front.

As shown in FIG. 1A, a lens portion 14, a finder 15 for visually confirming the photographing range and the like, and a flash 16 for emitting auxiliary light when photographing under low illumination or the like, are mounted at the front side of the main body 11. The lens portion 14 has a zoom lens (a lens whose focal length can be varied) which is equipped with an autofocus (AF) function, and has a lens driving mechanism which is not illustrated. The lens driving mechanism is structured to include a zoom motor which is the driving source of a zoom mechanism which changes the focal length of the zoom lens, and a focal point adjusting (focussing) motor which is the driving source of an AF mechanism which, in the AF function, carries out focal point adjustment by moving a focus lens within a predetermined range in which movement is possible.

A slot 17 is formed in the right side surface as seen from the front of the main body 11. A memory card, which will be described later and which stores various types of information such as photographed image information or the like, can be loaded into the slot 17. A mode dial 13 and a power switch 18 are provided on the top surface of the main body 11, at the left side as seen from the front. A release button 12 is provided at the central portion of the mode dial 13.

The mode dial 13 is a dial for selecting the operational mode of the digital camera. The mode dial is used to switch between an automatic photographing mode (in accordance with autofocus (AF), auto exposure (AE), or the like) and a manual photographing mode, and to select the mode. The mode dial 13 is also used for selecting a portrait photographing mode used when the subject to be photographed is mainly a person, a macro photographing mode used when photographing a subject at a close distance, a photographed image playback mode, a PC output mode for connecting to and outputting images to a personal computer, and a set-up item setting mode for setting the initial conditions of the respective functions.

Moreover, as shown in FIG. 1B, a liquid crystal display (LCD) 20, which is either a reflecting-type or transmitting-type and which can display in color, is mounted to the lower side of the back surface of the main body 11. A liquid crystal display panel 22 for monochromatic display, and various types of selection buttons such as a flash button 24, a cross button 19, a menu execute button 26 and the like are provided above the LCD 20.

The LCD 20 is structured by a liquid crystal display panel whose display screen size is set to a predetermined number of pixels (e.g., 640×480 pixels). When an instruction to display an image is received, the LCD 20 displays, on the entire screen, the image of the photographed subject or an image based on an image file read from a memory (which will be described later) or the memory card, or carries out thumbnail display in which a plurality of reduced images are lined up, and displays a screen for selecting various types of functions. Further, the liquid crystal display panel 22 displays various types of items for which setting has been carried out, such as the operational mode, image quality, battery power, flash on/off, number of shots which can be taken, and the like.

The cross button 19 is a button which is for moving a cursor to select items displayed on the LCD 20 when the LCD 20 displays a screen for selecting various items. The flash button 24 is a button for giving a forced flash instruction when forcibly making the flash 16 emit light, and for giving a flash prohibiting instruction when prohibiting the flash 16 from emitting light. The menu execute button 26 is a button for deciding on execution of an item which is displayed on the LCD 20 and has been selected by the cross button 19.

Figure 2:
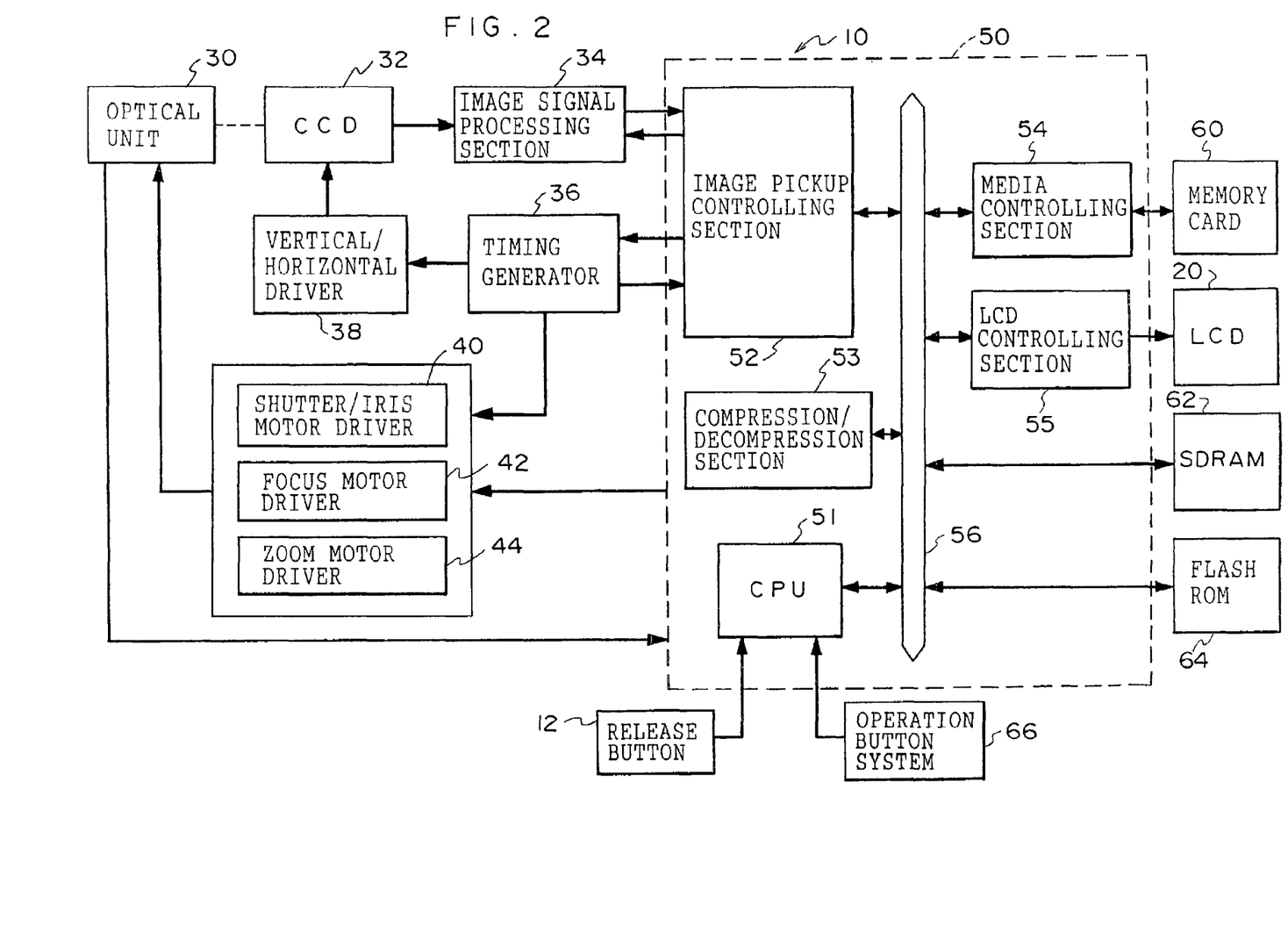
FIG. 2 is a schematic structural diagram of a control system of the digital camera relating to the embodiment of the present invention.

The schematic structure of the control system of the digital camera 10 is shown in FIG. 2. The digital camera 10 is structured to include an optical unit 30 formed to include the lens portion 14; a CCD 32 disposed at the rear, in the direction of the optical axis, of the lens portion 14; an image signal processing section 34 preparing predetermined digital image data expressing the subject, on the basis of the image signal outputted from the CCD 32 (a signal expressing the amount of light received at each of the plural photoelectric conversion cells arranged in matrix form on the light-receiving surface of the CCD 32); a timing generator 36 generating timing signals for driving the respective portions of the optical unit 30 and the CCD 32 and the like; a vertical/horizontal driver 38 which drives the CCD 32; a shutter/iris motor driver 40 which drives a shutter and a diaphragm mechanism included in the optical unit 30; a focus motor driver 42 driving the focus motor; a zoom motor driver 44 driving the zoom motor; and a main controlling section 50 governing the overall operational control of the digital camera 10. Note that the image signal processing section 34 and the main controlling section 50 are structured as a one-chip LSI (large scale integrated circuit). Accordingly, the digital camera 10 can be made to be compact, reliable, and inexpensive.

The image signal processing section 34 is structured to include a correlated double sampling circuit (CDS), a gain control amplifier (GCA), and an A/D converter (none of which is illustrated). The image signal inputted from the CCD 32 is subjected to correlated double sampling processing by the CDS, and sensitivity adjustment of each color of RGB is carried out by the GCA. Thereafter, the signal is converted into the aforementioned digital image data at the A/D converter.

A CPU (central processing unit) 51 governing the operational control of the entire main controlling section 50, and a line buffer of a predetermined capacity are incorporated in the main controlling section 50. Moreover, the main controlling section 50 includes an image pickup controlling section 52 structured so as to include a white balance adjusting circuit (WB) which adjusts fluctuations in the white balance, and a Y/C converting circuit (Y/C) which converts RGB data into a YC signal; a compressing/decompressing section 53 which carries out compression processing on digital image data by a predetermined compression format (e.g., JPEG format or the like), and carries out decompression processing on digital image data which has been subjected to compression processing; a media controlling section 54; and an LCD controlling section 55. The CPU and the aforementioned respective sections are connected together via a bus 56.

A memory card 60 (e.g., SmartMedia (trademark), Compact Flash, a micro drive, or the like), which is a portable recording medium which can be removably loaded into the slot 17 of the digital camera 10, is connected to the media controlling section 54. The media controlling section 54 controls the writing of various types of information to the memory card 60, and the reading of various types of information written at the memory card 60. Further, the LCD 20 is connected to the LCD controlling section 55. Under the control of the LCD controlling section 55, image information of the subject obtained by image pickup by the CCD 32, and other various types of information, are displayed on the LCD 20. Note that the LCD 20 can display dynamic images (through images) obtained by continuous image pickup by the CCD 32, and can be used as a finder.

A various operation buttons system 66, which includes the aforementioned mode dial 13, power switch 18, flash button 24, cross button 19, menu execute button 26, and the like, is connected to the CPU 51. The respective control signals thereof can be transmitted to the CPU 51.

The release button 12 is connected to the CPU 51. When the release button 12 is depressed halfway by operation of a user, the release button 12 transmits a predetermined control signal (signal S1) to the CPU 51. When the release button 12 is fully depressed by operation of the user, the release button 12 transmits a predetermined control signal (signal S2) to the CPU 51. When the CPU 51 receives signal S1, the CPU 51 carries out AF control processing (details of which will be described later) When the CPU 51 receives signal S2, the CPU 51 caries out photographed image recording processing (details of which will be described later).

The digital camera 10 is structured to include an SDRAM (synchronous dynamic RAM) 62 which mainly stores digital image data obtained by image pickup by the CCD 32; and a flash ROM 64 which stores various types of parameters and programs and the like. The SDRAM 62 and the flash ROM 64 are connected to the bus 56 of the main controlling section 50. Accordingly, the CPU 51 can arbitrarily access the various types of data stored in the SDRAM 62 and the flash ROM 64.

The image pickup controlling section 52 accumulates the digital image data, which is successively inputted from the image signal processing section 34, in a built-in line buffer, and temporarily stores the digital image data in the SDRAM 62. Under the control of the CPU 51, the digital image data which is stored in the SDRAM 62 is read by the WB and subjected to white balance adjustment, and is subjected to gamma processing, sharpness processing and the like. Moreover, at the Y/C, YC signal conversion processing is carried out so as to convert the data into YC signal data (luminance signal Y and chroma signals Cr, Cb). Thereafter, the YC signal data is stored in the SDRAM 62. Note that, when the LCD 20 is used as a finder, the generated YC signal data is successively outputted to the controlling section 55, and through images are displayed on the LCD 20.

In the photographed image recording processing which is executed when the release button 12 is fully depressed by operation of the user, the YC signal data stored in the SDRAM 62 is compressed in a predetermined compression format by the compression/decompression section 53, and thereafter, is stored in the memory card 60 via the media controlling section 54.

The vertical/horizontal driver 38, the shutter/iris motor driver 40, the focus motor driver 42, the zoom motor driver 44, and the image pickup controlling section 52 are connected to the timing generator 36. The timing generator 36 outputs, to the vertical/horizontal driver 44, a timing signal for driving the CCD 32, and outputs to the shutter/iris motor driver 40 a timing signal for driving the mechanical shutter and the diaphragm mechanism provided at the optical unit 30, and outputs to the image pickup controlling section 52 a timing signal for driving the image pickup controlling section 52.

The input ends of the focus motor driver 42 and the zoom motor driver 44 are connected to the main controlling section 50. The output end of the focus motor driver 42 is connected to the focus motor, and the output end of the zoom motor driver 44 is connected to the zoom motor. The focus motor and the zoom motor are driven by drive signals supplied from the focus motor driver 42 and the zoom motor driver 44, respectively, under the control of the main controlling section 50.

When the optical zoom magnification is changed by control by the main controlling section 50 (more specifically, the CPU 51), the zoom motor is controlled to be driven, and the focal length of the lens system is changed such that the photographic field angle can be changed to a desired angle. Moreover, AF control processing can be executed which carries out focus control for controlling the focus motor to be driven so as to move the focus lens to the position (the focus position) where the contrast of the image obtained by image pickup by the CCD 32 is the greatest. In the AF control processing, the value (AF evaluation value) expressing the level of the focused state of the subject determined in accordance with the contrast of the picked-up image is obtained. On the basis of this AF evaluation value, the focus motor is controlled to be driven so as to move the position of the focus lens, and the position where the AF evaluation value is at a peak is set to be the focus position.

In the digital camera 10 relating to the present embodiment, when the power is on and the digital camera 10 is in a photographing standby state, through images obtained by continuous photographing by the CCD 32 are displayed on the LCD 20. At this time, synchronously with the image pickup driving timing of the CCD 32 (specifically, the timing for outputting the vertical synchronization signal at the CCD 32), continuous AF processing (hereinafter C-AF processing) is carried out which continuously carries out focal point adjustment of the lens portion 14 (i.e., searching for the focus position of the focus lens, and setting the focus lens at the detected focus position), so that the contrast of the read image of the subject positioned at the photographing position shown by the AF frame becomes a maximum (i.e., so that a focused state arises). As a result, through images which are in substantially focused states are displayed continuously on the LCD 20. Here, the so-called hunting phenomenon is suppressed (a phenomenon in which it appears as if the image is shaking by continuing to shift slightly front and back without the focus being determined, in order to carry out focal point adjustment of the lens portion 14 continuously).

Further, at the digital camera 10 relating to the present embodiment, in the photographing standby state in which the above-described C-AF processing is carried out, when the release button 12 is depressed halfway by the user and the signal S1 is detected by the CPU 51, the CPU 51 interrupts the C-AF processing, and carries out the aforementioned AF control processing such that AF locking arises. In the AF control processing carried out at this time, a predetermined focus position searching method (details of which will be described later) is selected in accordance with the operational state of the interrupted C-AF processing, so as to shorten the time for searching for the focus position of the focus lens. As a result, the processing time in the AF control processing is shortened. Since this AF control processing terminates at the AF locking for photographing the subject, it may be referred to as a non-continuous processing, thus differing from the continuous AF processing. Further, when the release button 12 is depressed fully by the user and the CPU 51 detects signal S2, the CPU 51 carries out the aforementioned photographing processing.

Next, operation of the present embodiment will be described.

Figure 3:
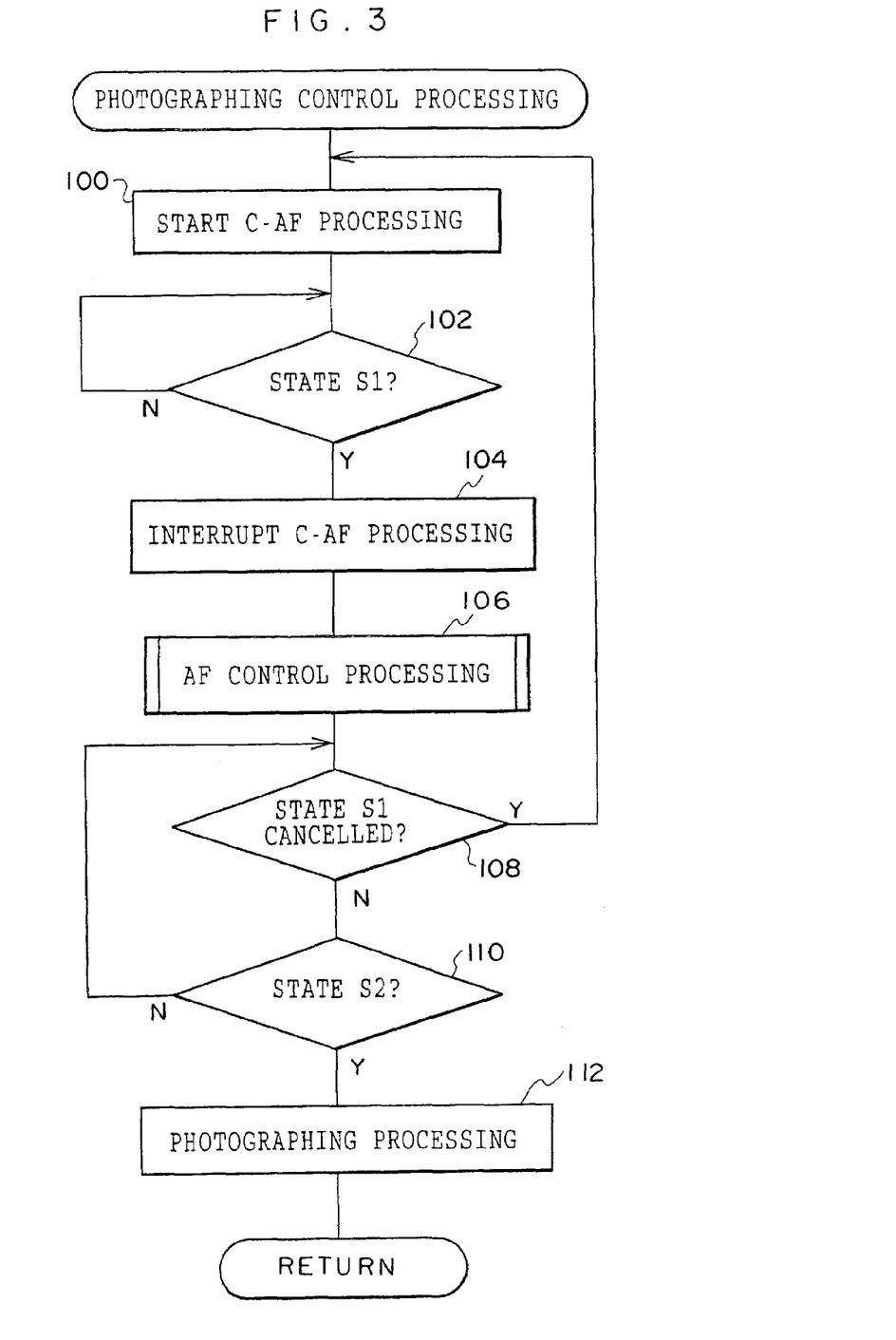
FIG. 3 is a flowchart showing the flow of photographing control processing relating to the embodiment of the present invention.

When the power is on and the digital camera 10 is in a photographing standby state, the processing routine shown in FIG. 3 is carried out at the digital camera 10.

First, in step 100, the above-described C-AF processing is started. The C-AF processing will be described with reference to the state of transitions of the operational state in the C-AF processing shown in FIG. 4. First, the focus lens of the lens portion 14 is driven a slight amount in the direction of the optical axis thereof. At this time, the search direction is determined (state ST1) on the basis of the AF evaluation value obtained in accordance with the contrast obtained from the picked-up image. The AF evaluation value varies in accordance with the change in the position of movement of the focus lens (see FIG. 5). Thus, the direction in which the AF evaluation value rises (e.g., the direction of arrow A in FIG. 5) is set as the search direction.

Figure 5:
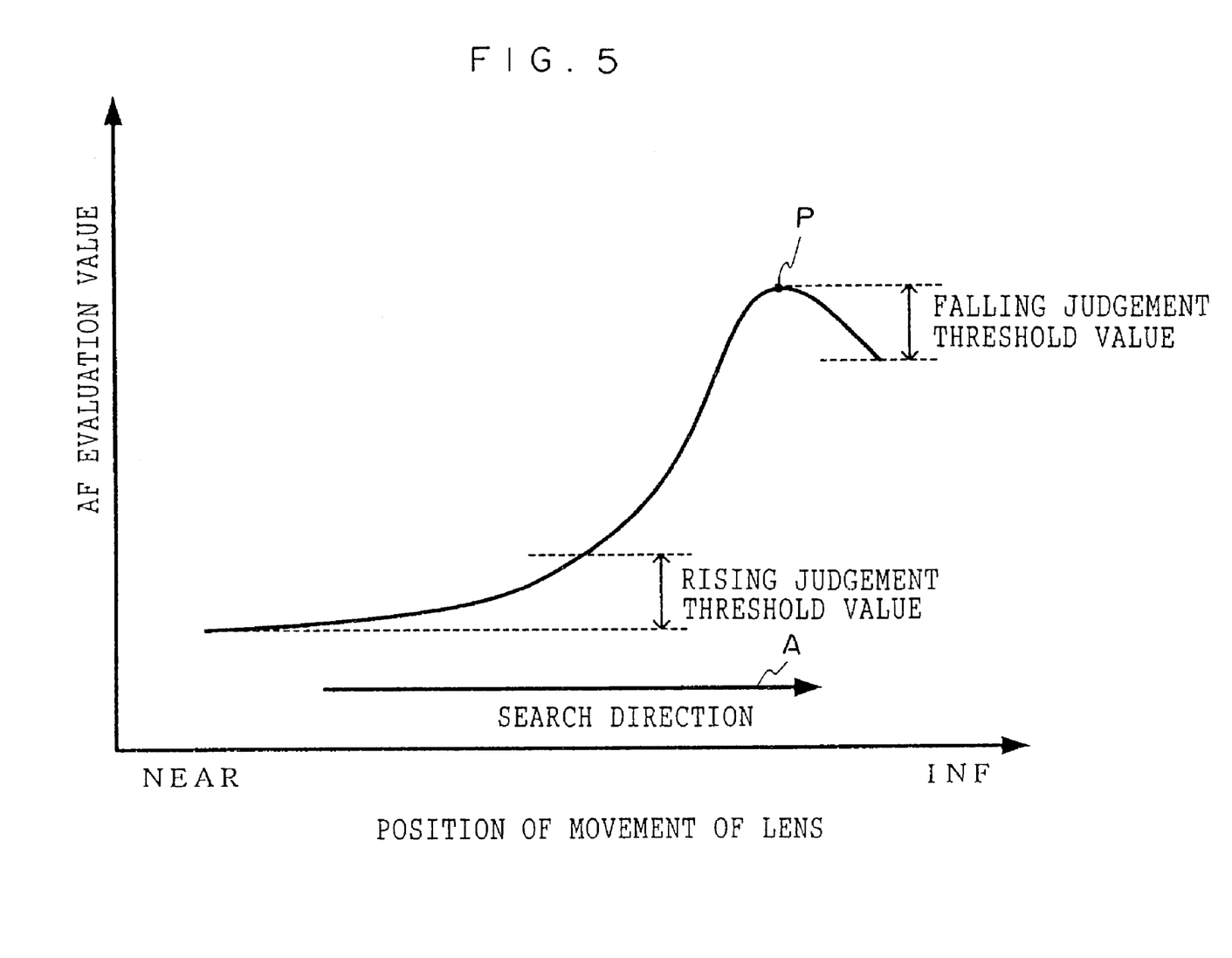
FIG. 5 is a graph showing an example of AF evaluation values corresponding to positions of movement of a focus lens.

Next, the focus lens is moved in the set search direction, and the peak of the AF evaluation value is searched for (state ST2). As shown in FIG. 5, when the AF evaluation value obtained in accordance with movement of the focus lens rises to greater than or equal to a predetermined rising judgement threshold value (a threshold value for judging that the AF evaluation value is rising), and thereafter, falls to greater than or equal to a predetermined falling judgement threshold value (a threshold value for judging that the AF evaluation value is falling), it is judged that a peak P has been detected within this range of movement (peak judgement).

Figure 4:
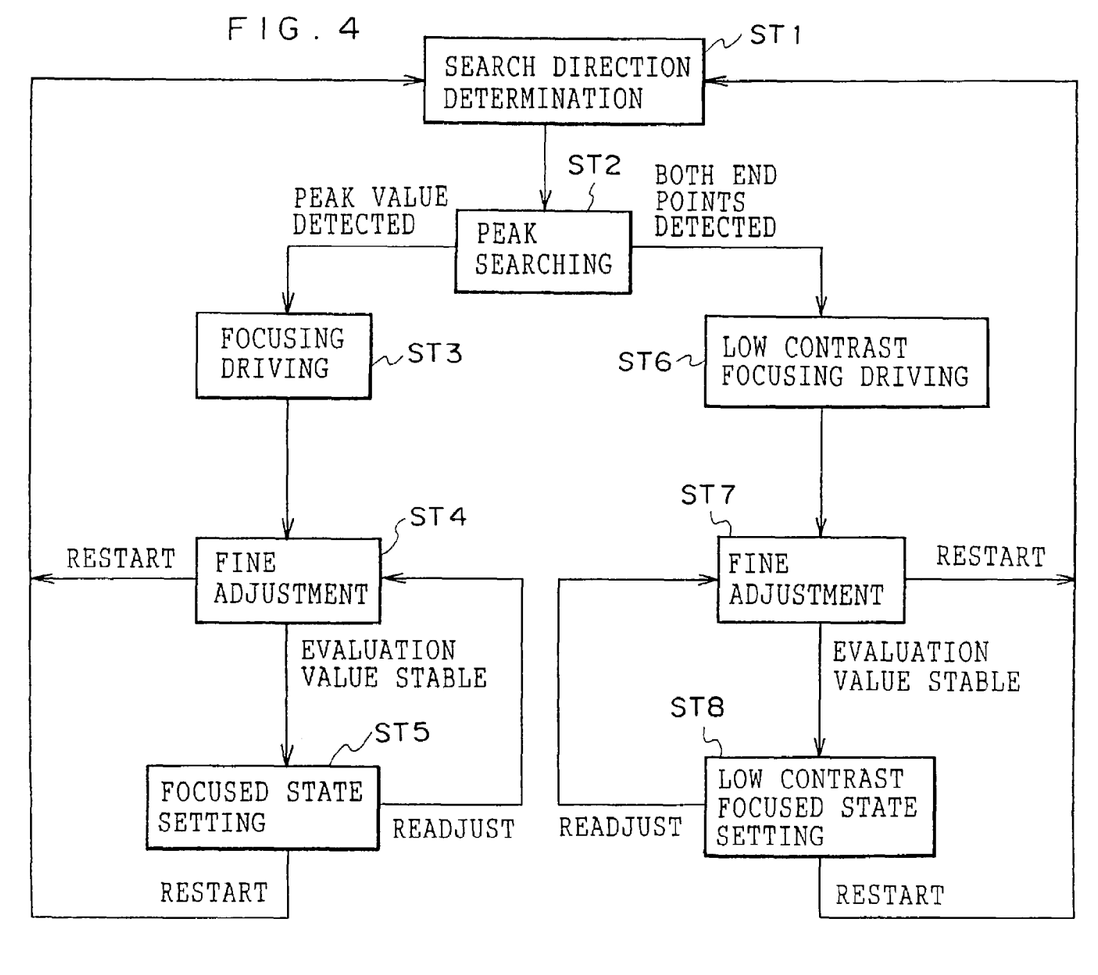
FIG. 4 is a diagram for explaining the state of transitions of an operational state in C-AF processing relating to the embodiment of the present invention.

When the peak P is detected, the focus lens is moved and positioned at the position (focus position) corresponding to the peak P (state ST3). Here, there is the possibility that the detected peak P is a peak which arises transiently due to movement of the subject or panning of the camera or the like. Thus, the focus lens position is finely adjusted (state ST4) by carrying out a processing for driving the focus lens by a slight amount, so as to drive in the same direction if the AF evaluation value is rising, or so as to reverse and drive in the opposite direction if the AF evaluation value is falling. When the AF evaluation value is in a stable state due to this fine adjustment, the focused state is set by positioning the focus lens by using the focus lens position at this time as the focus position (state ST5). After the focused state has been set, the AF evaluation value is detected again at a predetermined time. If the AF evaluation value has changed, the process returns to state ST4, and fine adjustment is carried out again. Further, if the AF evaluation value varies greatly during state S4 (fine adjustment) or state ST5 (setting of the focused state), the C-AF processing is restarted, and the process moves to state ST1.

On the other hand, in state ST2, when the focus lens has moved to the position of an end point of the range in which movement is possible (end point NEAR or end portion INF) without a peak being detected by the above-described peak judgement, the driving direction of the focus lens is reversed. At the point in time when both end points have been detected, it is judged that the contrast of the subject is low (low contrast), and the focus lens is moved to and positioned at the position (the low contrast focus position) corresponding to the maximum value of the AF evaluation values obtained until then (state ST6). Here, there is the possibility that the detected peak P is a peak which arises transiently due to movement of the subject or panning of the camera or the like. Thus, the focus lens position is finely adjusted (state ST7) by carrying out a processing for driving the focus lens by a slight amount, so as to drive in the same direction if the AF evaluation value is rising, or so as to reverse and drive in the opposite direction if the AF evaluation value is falling. When the AF evaluation value is in a stable state due to this fine adjustment, the low contrast focused state is set by positioning the focus lens by using the focus lens position at this time as the low contrast focus position (state ST8). After the low contrast focused state has been set, the AF evaluation value is detected again at a predetermined time. If the AF evaluation value has changed, the process moves to state ST7, and fine adjustment is carried out again. Further, if the AF evaluation value varies greatly during state S7 (fine adjustment) or state ST8 (setting of the low contrast focused state), the C-AF processing is restarted, and the process moves to state ST1.

When the C-AF processing is being executed as described above, if the release button 12 is set in a state of being depressed halfway (state S1) by the user, the judgement in step 102 is affirmative. The routine moves on to step 104 where the C-AF processing which is being executed is interrupted, and operational state information, which expresses the operational state of the C-AF processing at that time, is stored. The routine then moves on to step 106.

In step 106, AF control processing is carried out. Here, the AF control processing will be described in accordance with the processing routine shown in FIG. 6.

Figure 6:
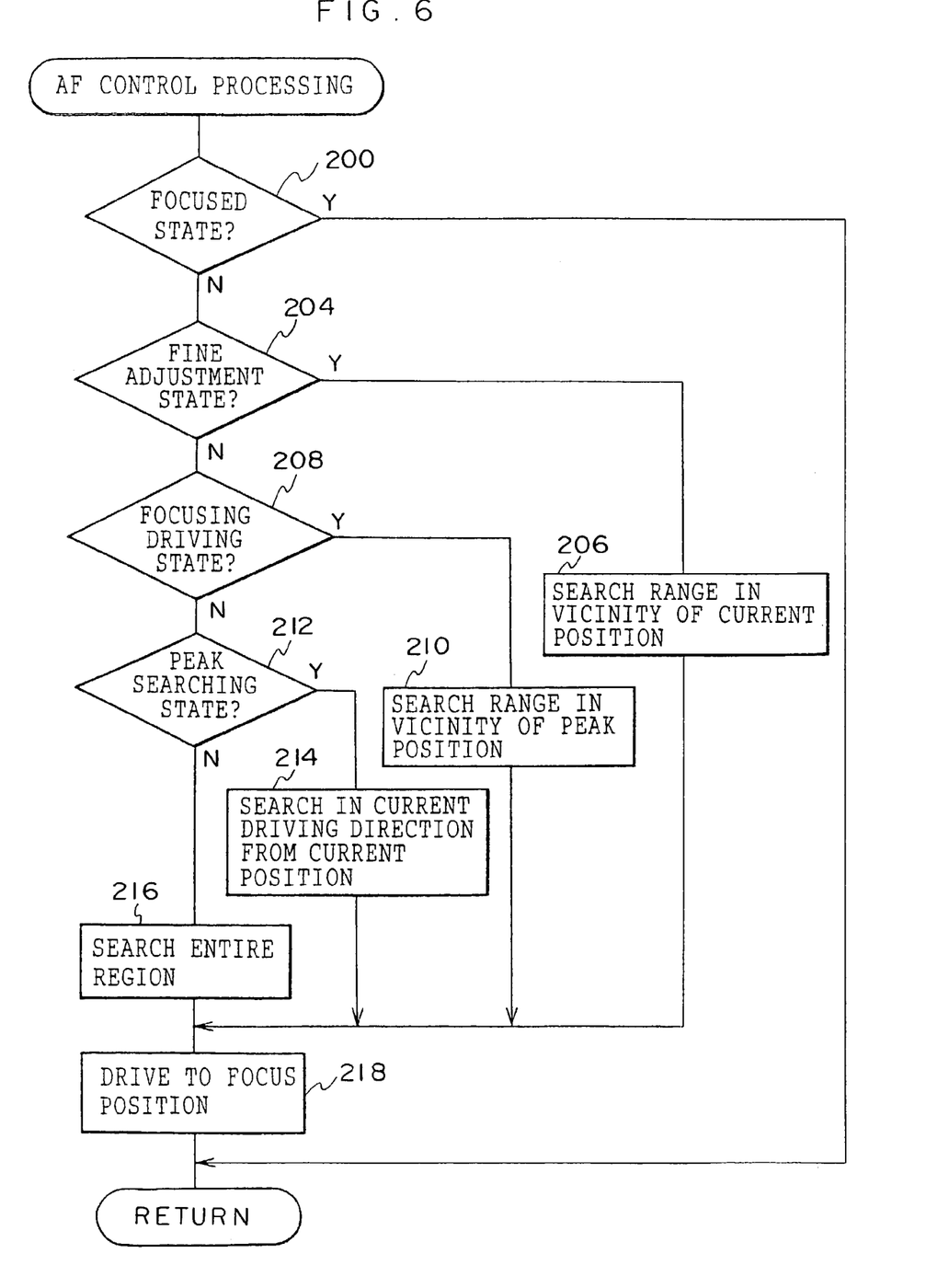
FIG. 6 is a flowchart showing the flow of AF control processing relating to the embodiment of the present invention.

First, in step 200, by referring to the stored operational state information, it is judged whether or not the operational state of the C-AF processing interrupted in step 104 is the focused state.

If the operational state of the C-AF processing immediately before state S1 is a state of setting the focused state (either state ST5 or state ST8), the judgement in step 200 is affirmative, and the present routine ends.

On the other hand, if the operational state of the C-AF processing immediately before state S1 is the state of fine adjustment (either state ST4 or state ST7), the judgement in step 200 is negative, and the routine moves on to step 204. The judgement in step 204 is affirmative, and the routine moves on to step 206. Because the position of movement of the focus lens is near the focus position, only a predetermined range in a vicinity of the current position of the focus lens is searched, and the focus position is detected. The routine moves on to step 218 where the focus lens is driven to the focus position, and the focused state is set.

Further, when the operational state of the C-AF processing immediately before state S1 is a state in the midst of driving the focus lens to the focus position (either state ST3 or state ST6), the judgements in steps 200 and 204 are negative, and the routine moves on to step 208. The judgement in step 208 is affirmative, and the routine moves on to step 210. Only a predetermined range in a vicinity of the position (the focus position) corresponding to the peak detected in the C-AF processing is searched, and the focus position is detected. The routine moves on to step 218 where the focus lens is driven to the focus position, and the focused state is set.

If the operational state of the C-AF processing immediately before state S1 is a state in which the determination of the search direction has ended and it is the peak searching state (state ST2) but the peak position has not been detected, the judgements in steps 200, 204, 208 are negative, and the routine moves on to step 212. When the judgement in step 212 is affirmative, the routine moves on to step 214. Because it is deemed that the peak position does not exist in the range which has already been searched, searching is carried out in the current direction of driving from the current position of the focus lens, and the focus position is detected. The routine moves on to step 218 where the focus lens is driven to the focus position, and the focused state is set.

If the operational state of the C-AF processing immediately before state S1 is none of the above states, the judgements in steps 200, 204, 208, and 212 are negative, and the routine moves on to step 216. The entire region of the range in which the focus lens can move is searched, and the focus position is detected. The routine moves on to step 218 where the focus lens is driven to the focus position, and the focused state is set.

After execution of the above-described AF control processing, the routine moves on to step 108 where a judgement is made as to whether the state in which the release button 12 is depressed halfway by the user (state Si) has been released or not. If the judgement is affirmative, the routine returns to step 100. If the judgement is negative, the routine proceeds to step 110.

In step 110, a judgement is made as to whether or not it is the state in which the release button 12 is fully depressed by the user (state S2). If the judgement is negative, the routine returns to step 108. If the judgement is affirmative, the routine proceeds to subsequent step 112. Photographing processing of the subject, which has been set in a focused state by the above-described AF control processing, is carried out. The present processing routine ends, and the digital camera 10 returns to the aforementioned photographing standby state.

As described above, in accordance with the digital camera relating to the present embodiment, the processing time for AF control can be greatly shortened by switching the AF control method at the time when signal S1 is detected, such that the AF control processing time is made to be the shortest on the basis of the C-AF operational state, by utilizing the fact that the focus position can be estimated to a certain extent before detection of signal S1 by the C-AF processing. As a result, photographing in an appropriately focused state can be carried out speedily without missing the chance for a good shot.

In the present embodiment, another method for shortening the AF processing time in state S1 is switching the AF search range in state S1 by estimating the distance to the peak position from the magnitude of the AF evaluation value during the C-AF processing.

As described above, in accordance with the present invention, during standby before executing photographing processing, focus control is carried out such that a focused state, in which the position of the light-receiving surface of the image pickup section and the imaging position by the imaging section coincide, is set continuously by the standby-time focus controlling section. When executing the photographing processing, at the point in time when an instruction to carry out focused state setting is given by the focus instructing section, the focus control by the standby-time focus controlling section is interrupted by the photographing-time focus controlling section. On the basis of the operational state of the focus control at the point in time of that interruption, focus control is carried out such that the processing time required for setting the focused state is the shortest. As a result, it is possible to provide a digital camera in which the AF control processing time is shortened, and the AF processing performance with respect to the subject at the time of photographing is improved.

What is claimed is:

1. A digital camera comprising:
  an imaging section imaging, at a predetermined imaging position, light from a subject;
  an image pickup section receiving, at a predetermined light-receiving surface, light from the subject which is incident via the imaging section, and generating image information for a still-image photograph of the subject on the basis of an amount of received light;
  a photographing controlling section acquiring the image information for the still-image photograph generated by the image pickup section, and carrying out control of execution of still-image photographing processing;
  a moving section moving at least one of the imaging section and the image pickup section in a direction of an optical axis of light incident via the imaging section;
  a standby-time focus controlling section which, at a time of standby before execution of the still-image photographing processing by the photographing controlling section, controls the moving section so as to continuously set a focused state in which the imaging position by the imaging section and a position of the light-receiving surface of the image pickup section coincide;
  a focus instructing section instructing setting of the focused state, at a time of execution of the still-image photographing processing by the photographing controlling section; and
  a photographing-time focus controlling section which, at a point in time when an instruction is given by the focus instructing section, interrupts focus control by the standby-time focus controlling section, and on the basis of an operational state of the focus control at a point in time of interruption, controls the moving section in order to minimize a processing time required for setting of the focused state,
  wherein the control by the photographing-time focus controlling section terminates in response to the setting of the focused state, and the still image photographing processing is executed after termination of the control by the photographing-time focus controlling section.

2. The digital camera of claim 1, further comprising:
  a storing section successively storing the operational state of the focus control by the standby-time focus controlling section,
  wherein, on the basis of the operational state of the focus control stored in the storing section, the photographing-time focus controlling section controls the moving section such that the processing time required for setting of the focused state is minimized.

3. The digital camera of claim 1, wherein the photographing-time focus controlling section controls the moving section by a control method appropriately selected, on the basis of the operational state of the focus control at the point of time of interruption, from plural types of control methods determined in advance such that the processing time, which is required for setting of the focused state in accordance with the operational state of the focus control by the standby-time focus controlling section, is minimized.

4. The digital camera of claim 2, wherein the photographing-time focus controlling section controls the moving section by a control method appropriately selected, on the basis of the operational state of the focus control at the point of time of interruption, from plural types of control methods determined in advance such that the processing time, which is required for setting of the focused state in accordance with the operational state of the focus control by the standby-time focus controlling section, is minimized.

5. The digital camera of claim 1, wherein the photographing controlling section includes:
  a white balance adjustment circuit adjusting variations in white balance; and
  a Y/C conversion circuit converting RGB data into a YC signal.

6. A method of controlling still-image photographing in a digital camera, comprising the steps of:
  carrying out continuous auto focus processing;
  when a release button is depressed halfway by a user during the continuous autofocus processing, interrupting the continuous autofocus processing which is being executed, and storing operational state information expressing an operational state of the continuous autofocus processing at the time of the interruption;
  in response to the interruption, carrying out non-continuous autofocus control processing based on the stored operational state information, said non-continuous autofocus control processing terminating when a focused state is achieved; and
  carrying out still-image photographing processing after termination of said non-continuous autofocus control processing.

7. The method of controlling photographing of claim 6, wherein the continuous autofocus processing comprises the steps of:
  (a) driving a focus lens of a lens portion to move by a minute amount in a direction of an optical axis of the focus lens, and at that time, judging a searching direction on the basis of an AF evaluation value obtained in accordance with contrast obtained from a picked-up image, and setting a direction in which the AF evaluation value rises as a search direction;

(b) moving the focus lens in a set search direction, and searching for a peak of the AF evaluation value;

(c) when the obtained AF evaluation value rises to greater than or equal to a predetermined rising judgement threshold value, and thereafter, falls to greater than or equal to a predetermined falling judgement threshold value, judging that a peak has been detected in a range of movement;

(d) when a peak is detected, moving and positioning the focus lens at a focus position corresponding to the peak;

(e) finely adjusting a focus lens position by driving the focus lens, and carrying out processing so as to drive in a same direction when the AF evaluation value is rising, and so as to reverse and drive in an opposite direction when the AF evaluation value is falling;

(f) when the AF evaluation value is in a stable state due to fine adjustment, setting a focused state by positioning the focus lens by using the focus lens position at that time as a focus position;

(g) after setting the focused state, again detecting the AF evaluation value at a predetermined time, and if there are changes, again carrying out the fine adjustment of step (e); and (h) if the AF evaluation value has changed more than a predetermined amount in step (e) or step (f), carrying out step (a) again.

8. The method of controlling photographing of claim 7, wherein the continuous autofocus processing further comprises:

(i) when, in step (b), the focus lens has moved to a position of an end point of a range, in which the focus lens can move, without a peak being detected by the peak judgement, reversing a driving direction of the focus lens, and at a point in time when both end points have been detected, judging that contrast of the subject is low, and moving and positioning the focus lens at a position corresponding to a maximum value of AF evaluation values obtained until then;

(j) finely adjusting a focus lens position by driving the focus lens, and carrying out processing so as to drive in a same direction when the AF evaluation value is rising, and so as to reverse and drive in an opposite direction when the AF evaluation value is falling;

(k) when the AF evaluation value is in a stable state due to fine adjustment, setting a low contrast focused state by positioning the focus lens by using the focus lens position at that time as a low contrast focus position;

(l) after setting the low contrast focused state, again detecting the AF evaluation value at a predetermined time, and if there are changes, moving to step (j) and again carrying out the fine adjustment; and (m) if the AF evaluation value has changed more than a predetermined amount in step (j) or step (k), carrying out step (a) again.

9. The method of controlling photographing of claim 8, wherein the non-continuous autofocus control processing comprises the steps of:

referring to the stored operational state information, and judging whether or not an operational state of the continuous autofocus processing is a focused state;

when the operational state of the continuous autofocus processing is set to a focused state, ending a present processing routine;

when the operational state of the continuous autofocus processing is a state of fine adjustment, searching only a predetermined range in a vicinity of a current position of the focus lens, detecting the focus position, and driving the focus lens to the focus position so as to set the focused state;

when the operational state of the continuous autofocus processing is during driving of the focus lens to the focus position, searching only a predetermined range in a vicinity of a focus position corresponding to the peak detected in the continuous autofocus processing, detecting the focus position, and driving the focus lens to the focus position so as to set the focused state;

when the operational state of the continuous autofocus processing is a state in which a peak position has not been detected, searching in a current driving direction from a current position of the focus lens, detecting the focus position, and driving the focus lens to the focus position so as to set the focused state; and when the operational state of the continuous autofocus processing is none of the above states, searching an entire region of a range in which the focus lens can move, detecting the focus position, and driving the focus lens to the focus position so as to set the focused state.

* * * * *